US008449654B2

(12) United States Patent
Whitley et al.

(10) Patent No.: US 8,449,654 B2
(45) Date of Patent: May 28, 2013

(54) METHOD AND APPARATUS FOR THE SUPPLY OF DRY GASES

(75) Inventors: Roger Dean Whitley, Allentown, PA (US); Pascal Lisbet, Arquennes (BE); Daniel Louis Vassilaros, Allentown, PA (US); Stuart Alexander Kerr, Knutsford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/214,797

(22) Filed: Aug. 22, 2011

(65) Prior Publication Data

US 2013/0047848 A1 Feb. 28, 2013

(51) Int. Cl.
  *B01D 53/02* (2006.01)
(52) U.S. Cl.
  USPC ........... 95/117; 96/108; 96/134; 96/135; 96/153; 206/0.7
(58) Field of Classification Search ........... 95/117; 96/108, 134, 135, 153; 206/0.7
  See application file for complete search history.

(56) References Cited

U.S. PATENT DOCUMENTS

| | | | |
|---|---|---|---|
| 4,144,196 A | | 3/1979 | Schoofs |
| 4,273,621 A | * | 6/1981 | Fornoff ............... 203/19 |
| 4,857,584 A | * | 8/1989 | Vandermeersch et al. .... 524/791 |
| 5,347,822 A | * | 9/1994 | Lavin et al. ............... 62/85 |
| 5,409,526 A | | 4/1995 | Zheng et al. |
| 5,514,633 A | * | 5/1996 | Noguchi et al. .......... 502/64 |
| 5,531,809 A | * | 7/1996 | Golden et al. ........... 95/101 |
| 5,856,264 A | * | 1/1999 | Cohen et al. ............ 502/414 |
| 5,922,107 A | * | 7/1999 | Labasque et al. ........... 95/96 |
| 6,051,647 A | * | 4/2000 | House ...................... 524/590 |
| 6,313,059 B1 | * | 11/2001 | Lavin et al. .............. 502/68 |
| 6,387,160 B1 | * | 5/2002 | Dangieri et al. ............ 95/117 |
| 6,572,688 B2 | | 6/2003 | Irven et al. |
| 6,892,473 B1 | * | 5/2005 | Chiang et al. ............ 34/332 |
| 6,932,945 B2 | | 8/2005 | Hertzler |
| 7,767,178 B2 | * | 8/2010 | Hilaly et al. ............ 423/245.1 |
| 2005/0178566 A1 | | 8/2005 | Meserve et al. |
| 2007/0214959 A1 | * | 9/2007 | Le Bec et al. ............ 95/117 |
| 2010/0081851 A1 | * | 4/2010 | Cohen et al. ............ 568/917 |
| 2010/0240524 A1 | * | 9/2010 | Hilaly et al. ............ 502/34 |

FOREIGN PATENT DOCUMENTS

| | | |
|---|---|---|
| GB | 2109359 | 6/1983 |
| JP | 55147149 | 11/1980 |
| JP | 2001-120989 | 5/2001 |
| WO | 97/06104 | 2/1997 |

OTHER PUBLICATIONS

D.W. Breck, et al, Crystalline Zeolites. I. The Properties of a New Synthetic Zeolite, Type A, Journal of the American Chemical Society, 1956, 5963-5971, 78.
Q. Liu, et al, NaKA sorbents with high CO2-over-N2 selectivity and high capacity to adsorb CO2, Chem. Commun., 2010, 4502-4504, 46.
V.K. Kaushik, et al, XPS studies on cation exchanged zeolite A, Microporous and Mesoporous Materials, 2001, 139-144, 51.
W. Zamechek, Determination of the elemental compositor of zeolitic materials, Verified Syntheses of Zeolitic Materials—IZA Synthesis Commission website—www.iza-online.org/synthesis, 2001.

* cited by examiner

*Primary Examiner* — Christopher P Jones
(74) *Attorney, Agent, or Firm* — Willard Jones, II

(57) ABSTRACT

A built in purifier for a cylinder of essentially nitrogen free gas having a low water content is provided with a molecular sieve 3A adsorbent to adsorb water from the gas, the 3A adsorbent having a particularly low adsorption capacity for nitrogen.

13 Claims, 2 Drawing Sheets

METHOD AND APPARATUS FOR THE SUPPLY OF DRY GASES

BACKGROUND OF THE INVENTION

The present invention relates to methods and apparatus for the supply of gases having a low water content and a low nitrogen content. The invention has particular relevance to the supply of gases from pressurised cylinders.

U.S. Pat. No. 5,409,526 describes a built in purifier for a gas supply cylinder. The purifier comprises a body of adsorbent in contact with the pressurised gas content of the cylinder, the adsorbent normally being arranged in a flow path for gas leaving the cylinder. There are several circumstances in which a supply of very dry gas may be needed, one being for use in the electronics industry, for instance in semiconductor fabrication. Whilst a water removing purifier containing adsorbent may be included in a supply line to be connected to a gas cylinder, operation costs can be reduced by maximising the life time of such a purifier by minimising the amount of water contained in the gas to which it is exposed. In U.S. Pat. No. 5,409,526, the adsorbent suggested for use in the built in purifier was Type 4A zeolite. The built in purifier described in U.S. Pat. No. 5,409,526 has proved very successful.

However, we have now discovered that in certain instances gas supplied from cylinders in which the gas is supposed to be essentially nitrogen free actually contains more nitrogen than it should, even though the bulk supply from which the cylinder was filled was satisfactorily low in nitrogen.

BRIEF SUMMARY OF THE INVENTION

The present invention now provides in a first aspect a method for removing traces of water from a supply of an inorganic gas which has a nitrogen content of less than 1 ppm$_v$ (parts per million by volume) and a water content of less than 100 ppm$_v$, comprising contacting the gas with an adsorbent having a capacity to adsorb water from said gas, said adsorbent having a nitrogen adsorption capacity below 0.01 mgmole/g (milligram moles per gram) at 23° C. and 101 kilopascals.

In an alternative second aspect, the invention provides a method for removing traces of water from a supply of an inorganic gas which has a nitrogen content of less than 1 ppm$_v$ and a water content of less than 100 ppm$_v$, comprising contacting the gas with an adsorbent having a capacity to adsorb water from said gas, said adsorbent being a 3A zeolite having a potassium exchange level of not less than 15%, with the balance of the cations being sodium. The 3A zeolite may be contained within a formed adsorbent particle, wherein the formed adsorbent particle is otherwise free of nitrogen adsorbing components. More generally, the adsorbent is preferably free of non-3A nitrogen adsorbing components. Other components may be considered to be not nitrogen adsorbing if they have a nitrogen adsorption capacity below 0.01 mgmole/g (milligram moles per gram) at 23° C. and 101 kilopascals.

The adsorbent should be free from nitrogen adsorbing components, which would include for instance other zeolite types, in order to avoid their greater nitrogen capacity, and should also be free of non-zeolite material with nitrogen adsorption capacity, such as for instance certain binders. Materials that are inert in the sense of lacking nitrogen adsorption capacity may be present.

The zeolite's potassium exchange level is preferably not less than 20%.

Measurements we have made on very low nitrogen content gas supplied in contact with such an adsorbent have not shown the excess nitrogen concentrations referred to above for 4A-based built in purifier systems. Without being bound by the following theory, we suspect that where the water adsorbent chosen, e.g. Type 4A zeolite, has a significant capacity to adsorb nitrogen, there is a possibility of the adsorbent accidentally taking up nitrogen by momentary exposure to atmosphere, for instance in the process of assembling a built in purifier gas cylinder system and filling it with low nitrogen content gas to be supplied. This adsorbed nitrogen then contaminates the supplied gas during customer use.

This danger is avoided according to the invention by ensuring that the adsorbent used for water adsorption does not have a significant capacity to adsorb nitrogen from the atmosphere.

Preferably, the supply of inorganic gas is in a pressurised container and said adsorbent is present in said container.

Preferably, the adsorbent is present in a conduit connected to an outlet for gas from said container. Typically, the container will be a gas cylinder.

In a further aspect, the invention provides a cylinder containing a pressurised inorganic gas to be supplied from said cylinder, said gas having been introduced into said cylinder from a bulk supply of said gas having a nitrogen content of less than 1 ppm$_v$ and a water content of less than 100 ppm$_v$, said cylinder containing an adsorbent in contact with said gas for adsorbing water from said gas, wherein said adsorbent has a capacity to adsorb water from said gas and has a pure nitrogen adsorption capacity below 0.01 mgmole/g at 23° C. and 101 kilopascals.

In an alternative aspect the invention provides a cylinder containing a pressurised inorganic gas to be supplied from said cylinder, said gas having been introduced into said cylinder from a bulk supply of said gas having a nitrogen content of less than 1 ppm$_v$ and a water content of less than 100 ppm$_v$, said cylinder containing an adsorbent in contact with said gas for adsorbing water from said gas, said adsorbent being a 3A zeolite having a potassium for sodium exchange of not less than 15% and being free of nitrogen adsorbing components.

The degree of potassium for sodium exchange may be determined by the use of common techniques for determination of metals in zeolites, including Inductively Coupled Plasma Emission Spectroscopy (ICP), Atomic Adsorption Spectroscopy (AAS), or X-Ray Fluorescence Spectroscopy (XRF). Further details may be found in Zamechek W. 'Determination of the elemental compositor of zeolitic materials', 2001, Verified Syntheses of Zeolitic Materials' H. Robson Ed. Elsevier Science BV. www.iza-online.org/synthesis. From such an analysis, one obtains the total milliequivalents of sodium and potassium. In this specification, we report the percentage of potassium exchange as 100 times the milliequivalents of potassium divided by the sum of milliequivalents of potassium and sodium.

According to either of these aspects, preferably said adsorbent is contained in a chamber which has an inlet and an outlet and defines a flow path through said adsorbent between said chamber inlet and said chamber outlet, and is arranged with the chamber inlet in fluid communication said gas in the cylinder and with the chamber outlet in fluid communication with an outlet for the supply of said gas from said cylinder.

The invention is not however restricted to the supply of gas from cylinders and the adsorbent need not be present in a so-called built in purifier. The same kind of danger of nitrogen contamination can arise in connecting an in-line purifier in a gas supply pipeline to a gas supply source.

The gas to be supplied is itself effectively nitrogen free, having a nitrogen content of not more than 1 ppm$_v$. More preferably, the nitrogen content of the gas to be supplied is not more than 500 ppb$_v$ (parts per billion by volume), for instance not more than 200 ppb$_v$. Where the gas is supplied from a cylinder or other container, these concentrations apply to the bulk gas prior to filling.

Preferably, the water content of the gas to be supplied is already very low before contact with the adsorbent, for instance the content of the filling gas supplied to a cylinder or the gas supplied from another supply via the adsorbent may be not more than 10 ppm$_v$/vol, more preferably not more than 5 ppm$_v$/vol and more preferably not more than 1 ppm$_v$/vol.

Whereas U.S. Pat. No. 5,409,526 disclosed the use of Type 4A zeolite for water adsorption, we prefer according to the present invention to use a Type 3A zeolite having a sufficient level of potassium ion exchange. Type 3A zeolite is typically formed from Type 4A zeolite by at least partial exchange of the sodium ions of Type 4A zeolite with potassium. As is known (e.g. Breck et al, J. Am. Chem. Soc. Dec. 8, 1956, No. 23, Vol. 78, pp 5963-5972) such exchange reduces the pore size progressively with increasing extent of potassium exchange. As we show in the examples below, commercially available Type 3A zeolites have varying degrees of nitrogen capacity, which we attribute to varying degrees of potassium exchange. For instance UOP XL8 is marketed for water adsorption, particularly in the context of drying gas between panes of multiple pane glazing.

However, such a material is found to be inadequate for use in the invention. As described below, we have determined that it has a nitrogen capacity which is too great to be suitable.

Whilst Type 3A zeolite is commonly suggested as a desiccant, generally the exchange level is not specified and is not seen as being of significance. Thus, for example, WO 97/06104 discloses the use of Type 3A zeolite for removing water from ammonia for use in the semiconductor industry, but specifies no level of exchange. As is shown in Kaushik et al, Microporous and Mesoporous Materials, vol. 51, pp 139-144 (2002), increasing the level of exchange reduces the capacity of the 3A adsorbent for water. Accordingly, there would seem to have been no reason normally to select a highly potassium exchanged Type A material for use in drying.

Similarly, US 2005/0178566 which teaches including molecular sieve Type 3A as a desiccant in a fire extinguisher containing halocarbons does not teach the need for any particular degree of exchange.

GB 2109359 describes the manufacture of 3A type zeolite for use as a desiccant for ethylene for which it is preferred on account of its water adsorption capacity and inability to adsorb ethylene itself. Nitrogen adsorption is not discussed.

Preferably, the adsorbent is contained within a container of pressurised gas, preferably in a conduit communicating with an outlet of gas from said container. The container may be a gas supply cylinder and the arrangement of the adsorbent therein may be as described in U.S. Pat. No. 5,409,526.

In a third aspect, the invention provides gas supply apparatus comprising a source of gas to be supplied, the gas having a nitrogen content of less than 1 ppm$_v$ and a water content of less than 100 ppm$_v$, a gas supply conduit in communication with said source, an adsorbent in contact with said gas for adsorbing water from said gas, wherein said adsorbent has a capacity to adsorb water from said gas and has a nitrogen adsorption capacity below 0.01 mgmole/g at 23° C.

Alternatively, in a fourth aspect the invention provides gas supply apparatus comprising a source of gas to be supplied, the gas having a nitrogen content of less than 1 ppm$_v$ and a water content of less than 100 ppm$_v$, a gas supply conduit in communication with said source, an adsorbent in contact with said gas for adsorbing water from said gas, wherein said adsorbent is a 3A zeolite having a potassium for sodium exchange level of not less than 15% and is free of non-3A nitrogen adsorbing components.

In accordance with either of these aspects of the invention, the apparatus may comprise a cylinder or other container for pressurised gas having a valve, said valve being adapted to close said cylinder, and having means for filling and removing fluid from said cylinder via two internal ports connected to said means for filling and removing of fluid, and a unit connected to one of said ports said unit containing a said adsorbent, whereby impurities are removed from said fluid as it is withdrawn from said cylinder through said unit.

Optionally, the second of said two internal ports opens directly into said cylinder and the apparatus further comprises a filling valve member for permitting and preventing fluid flowing from said means for filling and removing of fluid to the second of said two internal ports and a discharge valve member for permitting and preventing fluid flow from the first of said two internal ports to said means for filling and removing of fluid.

The apparatus may further comprise a filling adaptor which, when inserted in said means for filling and removing of fluid, prevents fluid from flowing from said means for filling and removing of fluid to the first of said two internal ports.

The apparatus may further comprise a discharge adaptor which, when inserted in said means for filling and removing of fluid, prevents fluid from flowing from the second of said two internal ports to said means for filling and removing of fluid.

In any of the aspects of the invention, a catalyst may be provided to enhance the operation of the invention, for instance to remove oxygen.

The gas to be supplied may be hydrogen, helium, oxygen, argon or other noble gases or blends of any of these gases.

BRIEF DESCRIPTION OF SEVERAL VIEWS OF THE DRAWINGS

The invention will be further described and illustrated with reference to the accompanying drawing, in which.

DETAILED DESCRIPTION OF THE INVENTION

Figure 1:
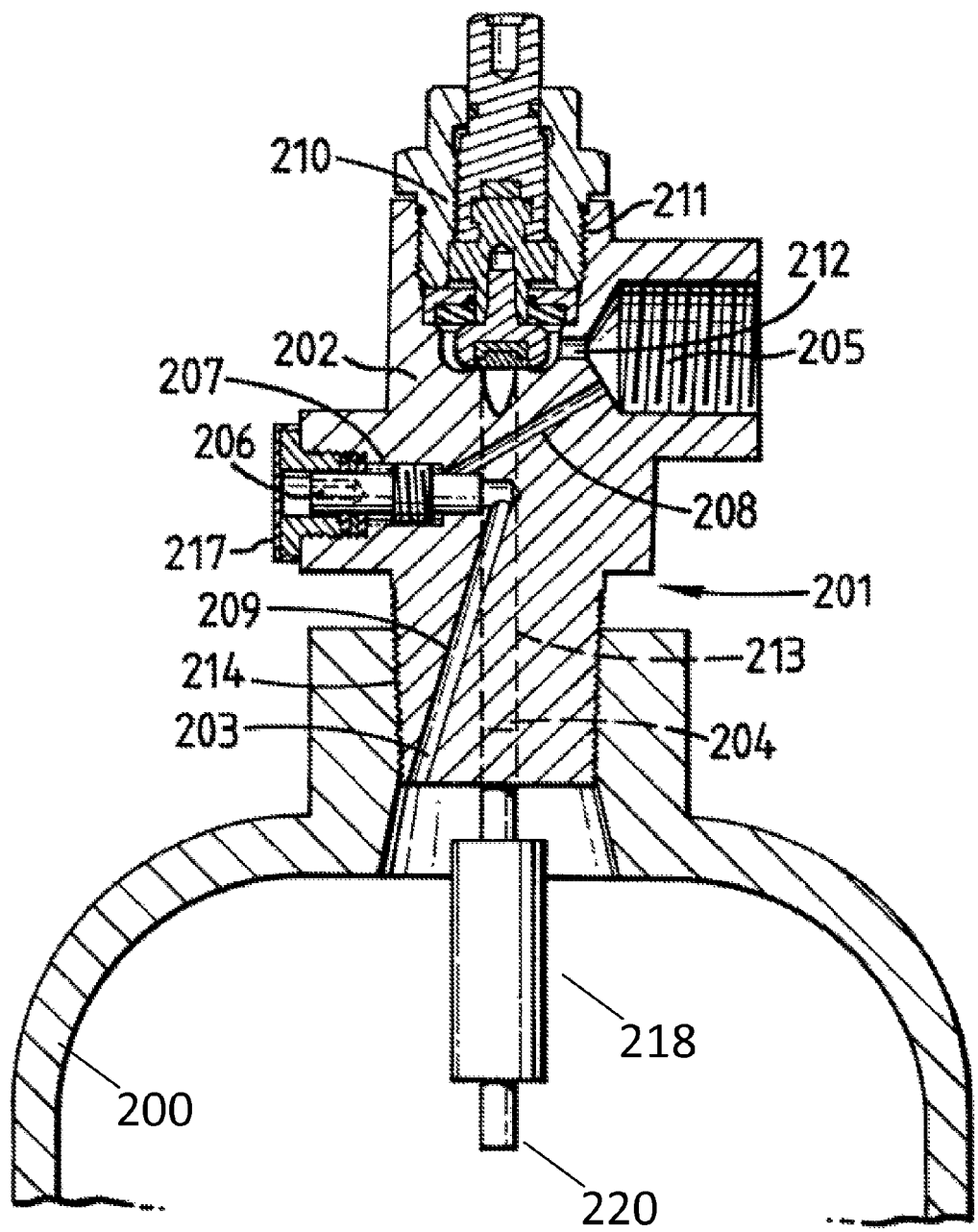
FIG. 1 shows an apparatus of the invention in simplified cross section.

FIG. 1 shows an apparatus in accordance with the invention. The construction of the apparatus is as described in U.S. Pat. No. 5,409,526, except as regards the adsorbent. There is shown a cylinder 200 having a cylinder valve which is generally identified by the reference numeral 201. The cylinder valve 201 comprises a body 202 having a first internal port 203, a second internal port 204 and an external port 205.

A filling valve member 206 is threadedly mounted in a bore 207 in the body 202 and, in the position shown, prevents gas flow between the external port 205 and the first internal port 203 via a passageway formed by bore 208 and bore 209.

A discharge valve member 210 is threadedly mounted in a bore 211 in the body 202 and, in the position shown, prevents gas flow between the external port 205 and the second internal port 204 via bore 212 and bore 213.

A unit is attached to the second internal port 204 and the whole assembly is fitted into a cylinder to which the valve 201 is threadedly attached via neck 214.

Figure 2:
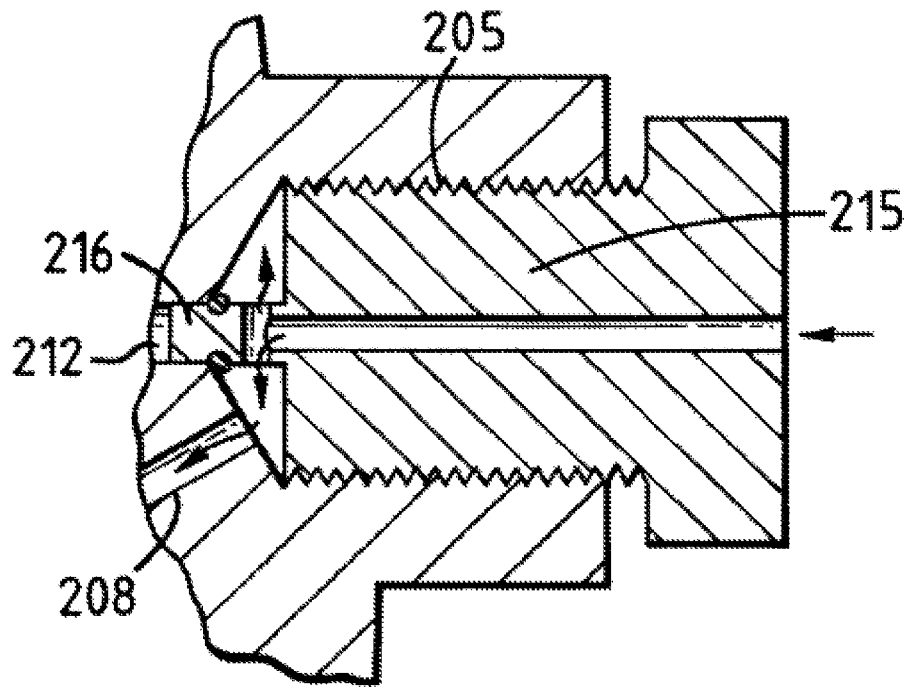
FIG. 2 shows in cross section a filling adaptor for use in conjunction with the apparatus of FIG. 1.

In order to fill the cylinder the filling adaptor 215 shown in FIG. 2 is screwed into the external port 205. The tip 216 of the filling adaptor 215 enters and obstructs the bore 212. Filling valve 206 is then opened and the cylinder is first: evacuated via bores 209 and 208. It is then filled with the required gas via bores 208 and 209.

It will be noted that during the filling operation the bore 212 is isolated from the supply of high pressure gas so that even if discharge valve member 210 is inadvertently left open high pressure gas will not be admitted to the interior of the unit.

At the completion of filling, filling valve member 206 is closed and filling adaptor 215 is removed (Discharge valve member 210 should be closed.) A security seal may then be placed over the gland nut 217 to deter tampering with the filling valve member 206.

Figure 3:
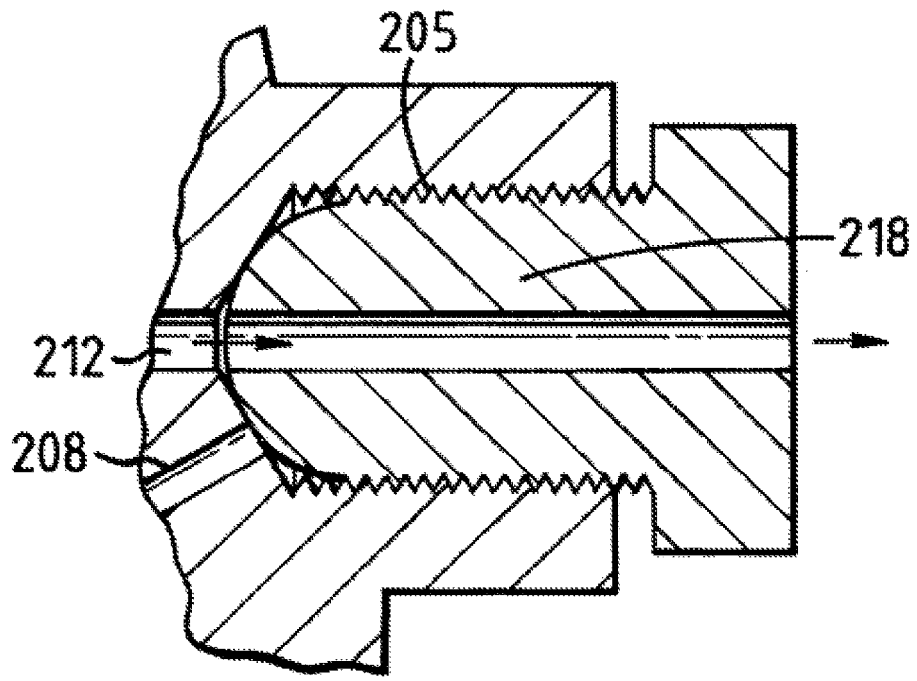
FIG. 3 shows in cross section a discharge adaptor for use in conjunction with the apparatus of FIG. 1.

After delivery, the customer mounts a pressure regulator on the external port 205 via a discharge adaptor shown in FIG. 3. The discharge adaptor communicates with bore 212 and closes bore 208. Once the pressure regulator is properly connected the customer opens discharge valve member 210 to allow gas in the cylinder to flow through the unit to the pressure regulator via second internal port 204 and bores 213 and 212.

If filling valve member 206 is tampered with and/or inadvertently opened, the flow of gas from the cylinder will be stopped by the discharge adaptor.

An adsorption unit 218 is connected to internal port 204 and extends into the cylinder 200 and has an inlet 220. The unit 218 comprises a first filter which is positioned adjacent the inlet 220 and is designed to remove particles having a diameter greater than 15 microns.

Above the first filter, the unit 218 comprises at least a layer of zeolite 3A having a suitable degree of potassium exchange and low nitrogen capacity. This layer of 3A should be adjacent to and just above the first filter. Additional layers of adsorbents or getters may be placed above the 3A layer. A second filter is mounted adjacent the outlet of the unit 218 and is capable of removing particles having a diameter greater than 0.5 microns.

Examples of suitable zeolites 3A include UOP EPG and UOP XH-11.

The following examples further illustrate the invention and its benefits.

Example 1

Zeolite 4A Adsorption $N_2$ Isotherm

An adsorbent currently commercially used in built in purifier adsorbers is UOP S.A.B.D. beaded 4A. It is designed to adsorb water, but also can adsorb the major components of air ($N_2$, $O_2$).

To insure the adsorbent was fully activated, we performed the following activation procedure. A 9 mL sample of the 4A beads was loaded into a stainless steel tube and placed into a laboratory tube furnace. A flow of 400 mL/min of vaporized liquid nitrogen was established through the tube. Using a preset program, the furnace heated from ambient to 400° C. at a ramp rate of 1° C./minute. The temperature was held at 400° C. for 4 hours and then the heat was shut off and the sample allowed to cool to room temperature under the 400 mL/min nitrogen flow. The sample was then transferred to an isotherm cell in a nitrogen-purged glove box to prevent re-adsorption of water.

We measured the pure nitrogen adsorption isotherm using a Micromeritics ASAP 2010 with the 1 torr pressure transducer option and determined there was the expected uptake of nitrogen.

| Nitrogen 4A zeolite, after flow activation Temp = 23° C. | |
|---|---|
| Pressure kPa/101 (atm) | Uptake (mgmole/g) |
| 0.00253 | 0.00081 |
| 0.00504 | 0.00162 |
| 0.00661 | 0.00213 |
| 0.00826 | 0.00266 |
| 0.00943 | 0.00305 |
| 0.01079 | 0.00349 |
| 0.01215 | 0.00394 |
| 0.01340 | 0.00434 |
| 0.01937 | 0.00626 |
| 0.02557 | 0.00823 |
| 0.03198 | 0.01027 |
| 0.04647 | 0.01486 |
| 0.06284 | 0.02004 |
| 0.12840 | 0.04050 |
| 0.26393 | 0.08177 |
| 0.39523 | 0.12069 |
| 0.52678 | 0.15856 |
| 0.65815 | 0.19535 |
| 0.78994 | 0.23108 |
| 0.92105 | 0.26592 |
| 0.99885 | 0.28607 |

Example 2

UOP XL8 3A Adsorption $N_2$ Isotherm

XL8 is a 3A molecular sieve product (i.e. containing no other zeolite phases) designed for use in insulated glass windows. It is designed to adsorb water, but not the major components of air ($N_2$, $O_2$, Ar).

To insure the adsorbent was fully activated, we performed the activation procedure described above.

We measured the nitrogen isotherm as before and determined that while the uptake is much less than for the 4A of Example 1, there is still some measurable uptake of nitrogen.

| Nitrogen | |
|---|---|
| 054-92 | UOP XL8, Flow Activated |
| Temp = 23° C. | |
| Pressure kPa/101 (atm) | Uptake (mgmole/g) |
| 0.00391 | 0.00000 |
| 0.00671 | 0.00001 |
| 0.00836 | 0.00001 |
| 0.00963 | 0.00003 |
| 0.01084 | 0.00004 |
| 0.01223 | 0.00005 |
| 0.01347 | 0.00005 |
| 0.01947 | 0.00007 |
| 0.02642 | 0.00011 |
| 0.03304 | 0.00013 |
| 0.04531 | 0.00019 |
| 0.06448 | 0.00027 |

-continued

| Nitrogen | | |
|---|---|---|
| 054-92 | UOP XL8, Flow Activated | |
| | Temp = 23° C. | |
| Pressure kPa/101 (atm) | | Uptake (mgmole/g) |
| 0.13206 | | 0.00054 |
| 0.26368 | | 0.00098 |
| 0.39511 | | 0.00138 |
| 0.52686 | | 0.00173 |
| 0.65829 | | 0.00205 |
| 0.78995 | | 0.00234 |
| 0.92146 | | 0.00265 |
| 0.99957 | | 0.00282 |

Example 3

UOP EPG 3A Adsorption $N_2$ Isotherm

We obtained UOP EPG 3A, which is a commercial product designed for ethylene purification. To insure the adsorbent was fully activated, we performed the following activation procedure. A 9 mL sample of the 3A beads was loaded into a stainless steel tube and placed into a laboratory tube furnace. A flow of 400 mL/min of vaporized liquid nitrogen was established through the tube. Using a preset program, the furnace heated from ambient to 400° C. at a ramp rate of 1° C./minute. The temperature was held at 400° C. for 4 hours and then the heat was shut off and the sample allowed to cool to room temperature under the 400 mL/min nitrogen flow. The sample was then transferred to an isotherm cell in a nitrogen-purged glove box to prevent readsorption of water.

Using the same equipment as in example 2, we measured the nitrogen isotherm of UOP EPG 3A. We found there was no detectable nitrogen uptake.

| Nitrogen | | |
|---|---|---|
| 054-91ACT | UOP 3A EPG, after flow activation | |
| | Temp = 23° C. | |
| Pressure kPa/101 (atm) | | Uptake (mgmole/g) |
| 0.00463 | | −0.00001 |
| 0.00675 | | −0.00002 |
| 0.00812 | | 0.00000 |
| 0.00958 | | 0.00000 |
| 0.01104 | | 0.00000 |
| 0.01231 | | 0.00000 |
| 0.01356 | | 0.00000 |
| 0.01939 | | −0.00003 |
| 0.02636 | | −0.00006 |
| 0.03308 | | −0.00008 |
| 0.04535 | | −0.00013 |
| 0.06459 | | −0.00019 |
| 0.13208 | | −0.00044 |
| 0.26368 | | −0.00100 |
| 0.38838 | | −0.00154 |
| 0.52675 | | −0.00220 |
| 0.65191 | | −0.00278 |
| 0.78992 | | −0.00343 |
| 0.91482 | | −0.00403 |
| 0.99903 | | −0.00441 |

Example 4

UOP XH-11 3A Adsorption Isotherm

We obtained UOP XH-11, which is a commercial 3A. To insure the adsorbent was fully activated, we performed the activation procedure described above.

Using the same equipment as in example 2, we measured the nitrogen isotherm of UOP XH-11 3A. We found there was no detectable nitrogen uptake.

| Nitrogen | | |
|---|---|---|
| 054-90ACT | UOP 3A XH-11, after flow activation | |
| | Temp = 23° C. | |
| Pressure kPa/101 (atm) | | Uptake (mgmole/g) |
| 0.00509 | | −0.00001 |
| 0.00745 | | −0.00001 |
| 0.00872 | | −0.00001 |
| 0.00994 | | −0.00001 |
| 0.01116 | | −0.00001 |
| 0.01237 | | 0.00000 |
| 0.01359 | | −0.00001 |
| 0.01947 | | −0.00002 |
| 0.02630 | | −0.00004 |
| 0.03307 | | −0.00008 |
| 0.04530 | | −0.00012 |
| 0.06445 | | −0.00018 |
| 0.13198 | | −0.00044 |
| 0.26367 | | −0.00100 |
| 0.39509 | | −0.00157 |
| 0.52695 | | −0.00219 |
| 0.65822 | | −0.00282 |
| 0.78991 | | −0.00346 |
| 0.92157 | | −0.00412 |
| 0.99957 | | −0.00450 |

Example 5

Test of a 4A Built in Purifier Cylinder Loading which Shows $N_2$ Contamination in Hydrogen A cylinder was filled with pure hydrogen having a nitrogen level of 0.4 ppm$_v$ according to the following protocol.
1. Fill empty adsorbent tube with UOP SABD 4A molecular sieve from bulk container
2. Add frit disk and circlip to bottom of the purifier tube to hold the media in the tube.
3. Fit the tube to a valve.
4. Insert the built in purifier assembly into an oven heated to at least 250° C., purge with helium flowing at least 1 slpm, approximately ±20 hours.
5. Remove the hot built in purifier assembly and install it in a cooling rack which has a low pressure of helium purge at the bottom fitting. Purpose is to provide an inert atmosphere as the tube cools and pressure drops.
6. After the built in purifier assembly has cooled, remove from the cooling rack and fit an o-ring sealing cap to it to prevent air ingress.
7. Prepare a cylinder with helium, leaving a low residual pressure in it.
8. Remove the preparation valve from the cylinder, remove the o-ring sealing cap from the bottom of the purifier tube, and quickly insert the built in purifier assembly into the cylinder. Torque the valve into the cylinder.

9. Fit a fill manifold pigtail to the valve outlet. After evacuating the manifold, open the built in purifier fill valve and evacuate the cylinder.
10. Then fill with $H_2$.

Following completion of this procedure, the nitrogen content of gas supplied from the cylinder was assessed as follows. Hydrogen gas was vented at a controlled rate of 80 ml/min for 8 hours through the adsorbent and then hydrogen flowing from the cylinder was subjected to analysis using an Orthodyne HE12 gas analyzer with a High frequency discharge detector (HFDD). This procedure was followed for five cylinders.

Results were as follows:

| UOP 4A | Fill gas ppm$_v$ | Purified gas ppm$_v$ |
|---|---|---|
| Cyl 1 | 0.4 | 0.5 |
| Cyl 2 | 0.4 | 2.2 |
| Cyl 3 | 0.4 | 12 |
| Cyl 4 | 0.4 | 1.1 |
| Cyl 5 | 0.4 | 0.8 |

It can be seen that nitrogen levels in some cylinders greatly exceeded the original fill gas content. Without being bound by a specific theory, we believe atmospheric $N_2$ is taken up on the 4A adsorbent in the built in purifier preparation steps 6 or 8.

Example 6

Test of a UOP XL8 3A Loading into Built in Purifier Cylinders which Shows Contamination with $N_2$ The procedure of Example 5 was repeated, except that there was no controlled venting through the purifier prior to analysis, but using a commercial zeolite 3A, i.e. UOP XL8 3A. The analyses were repeated multiple times to observe changes over time.

Initial $N_2$ contamination in $H_2$ was measured with the following results:

| UOP XL8 3A | Fill gas ppm$_v$ | Purified gas ppm$_v$ |
|---|---|---|
| Cyl 1 | 0.4 | 13 |
| Cyl 2 | 0.4 | 19 |
| Cyl 3 | 0.4 | 1.4 |
| Cyl 4 | 0.4 | 5.8 |
| Cyl 5 | 0.4 | 4.4 |

Sequential multiple analyses showed decreasing nitrogen values except for two of the five purifiers. The decreasing values demonstrate purging of the trapped $N_2$ from the molecular sieve. The two purifiers that did not purge down were clearly highly contaminated.

It can be seen that the 3A type molecular sieve did not prevent nitrogen contamination of hydrogen.

Example 7

Test of Loading UOP EPG and UOP XH-11 3A Adsorbents into Built in Purifier Cylinders which Showed No Contamination with $N_2$ The procedure of Example 6 was repeated twice using two further 3A molecular sieves, namely UOP XH-II and UOP EPG. No nitrogen contamination of the hydrogen was detected with either of these adsorbents in the built in purifier. Specifically, tests on five cylinders of hydrogen using a built in purifier containing molecular sieve UOP 3A XH11 produced the following nitrogen measurements:

| Molecular Sieve XH11 | Fill gas ppb$_v$ | Purified gas ppb$_v$ |
|---|---|---|
| Cyl 1 | 72 | 60 |
| Cyl 2 | 72 | 68 |
| Cyl 3 | 72 | 69 |
| Cyl 4 | 72 | 53 |
| Cyl 5 | 72 | 44 |

Tests on five cylinders of hydrogen using a built in purifier containing molecular sieve UOP 3A EPG produced the following nitrogen measurements:

| Molecular Sieve EPG | Fill gas ppb$_v$ | Purified gas ppb$_v$ |
|---|---|---|
| Cyl 1 | 72 | 110 |
| Cyl 2 | 72 | 72 |
| Cyl 3 | 72 | 57 |
| Cyl 4 | 72 | 44 |
| Cyl 5 | 72 | 53 |

The gas from the cylinders does not differ in a statistically significant manner from the measured fill concentration of nitrogen.

Example 8

Investigation of Effect of Degree of $K^+$ Exchange on Nitrogen Contamination

Following the procedures in Liu et al Chem. Commun. 46, pp 4502-4504 RSC 2010, a series of K+ exchanges of 4A powder purchased from Sigma-Aldrich were prepared. Ion exchange levels of sodium and potassium cations were determined. After ion exchange, the 2 to 3 gram samples were activated using the following procedure:

Heat sample in oven in porcelain dish. Start at 70° C. and hold for 30 minutes. Raise temperature in 10° C. increments and holds up to 110° C. Hold at 110° C. for ~45 minutes.

Remove to a nitrogen-purged glove box and load in a cell for vacuum activation.

Place on a vacuum activation unit and pump at room temperature to approximately $5 \times 10^{-5}$ torr.

Begin heating at 0.5° C./minute to 350° C. Hold temperature at 350° C. for 8 hrs.

Cool down and unload in glove box.

After the samples were activated, $N_2$ isotherms were measured at 23° C. using an ASAP 2010. The results are shown in the following table. By 16% K+ exchange, we were unable to detect adsorption of $N_2$, $O_2$, or Ar.

| Sample | Actual K amount (atomic % K/(K + Na)) | Isotherm uptake (relative amount $N_2$ adsorbed) |
|---|---|---|
| 1 | 3.75 | $N_2 > O_2 > Ar$ |
| 2 | 11.2 | $N_2 > O_2 > Ar$ |
| 3 | 16.04 | $N_2 = O_2 = Ar = 0$ |

-continued

| Sample | Actual K amount (atomic % K/(K + Na)) | Isotherm uptake (relative amount $N_2$ adsorbed) |
|---|---|---|
| 4 | 17.91 | $N_2 = O_2 = Ar = 0$ |
| 5 | 49.42 | $N_2 = O_2 = Ar = 0$ |

It was thereby deduced that the nitrogen contamination seen using a 3A molecular sieve in Example 6 was due to an insufficiently high level of potassium exchange, leading to a significant nitrogen adsorption capacity and that the good results obtained in Example 7 were due to the 3A molecular sieves tested having had a sufficiently high potassium exchange level.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. Gas supply apparatus comprising a source of inorganic gas to be supplied, said inorganic gas being contained within said source and having a nitrogen content of less than 1 ppm$_v$ and a water content of less than 100 ppm$_v$, a gas supply conduit in communication with said source, and an adsorbent in contact with said gas for adsorbing water from said gas, said adsorbent being a 3A zeolite having a potassium for sodium exchange of not less than 15% and being free of nitrogen adsorbing components.

2. Gas supply apparatus as claimed in claim 1, wherein the 3A zeolite is contained within a formed adsorbent particle, wherein the formed adsorbent particle is otherwise free of nitrogen adsorbing components.

3. Gas supply apparatus as claimed in claim 1, wherein said adsorbent has a capacity to adsorb water from said gas and has a pure nitrogen adsorption capacity below 0.01 mgmole/g at 23° C. and 101 kilopascals.

4. Apparatus as claimed in claim 1, wherein the source of inorganic gas is a pressurised container and said adsorbent is present in said container.

5. Apparatus as claimed in claim 4, wherein the adsorbent is present in said gas supply conduit and said gas supply conduit is connected to an outlet for gas from said container.

6. Apparatus as claimed in claim 1, wherein said gas is hydrogen, helium, oxygen, argon or other noble gases or blends of any of these gases.

7. Apparatus as claimed in claim 1, wherein the nitrogen content of the inorganic gas is not more than 500 ppb$_v$.

8. Apparatus as claimed in claim 7, wherein said nitrogen content is not more than 250 ppb$_v$.

9. Apparatus as claimed in claim 1, wherein the water content of said gas is not more than 10 ppm$_v$.

10. Apparatus as claimed in claim 9, wherein the water content of said gas is not more than 5 ppm$_v$.

11. A gas supply cylinder containing a pressurised inorganic gas to be supplied from said cylinder, said gas having been introduced into said cylinder from a bulk supply of said gas having a nitrogen content of less than 1 ppm$_v$ and a water content of less than 100 ppm$_v$, said cylinder containing an adsorbent in contact with said gas for adsorbing water from said gas, wherein said adsorbent has a capacity to adsorb water from said gas and has a pure nitrogen adsorption capacity below 0.01 mgmole/g at 23° C. and 101 kilopascals; wherein said adsorbent is a 3A zeolite having a potassium for sodium exchange of not less than 15% and being free of nitrogen adsorbing components.

12. A gas supply cylinder as claimed in claim 11, wherein said adsorbent is contained in a chamber which has an inlet and an outlet and defines a flow path through said adsorbent between said chamber inlet and said chamber outlet, and is arranged with the chamber inlet in fluid communication said gas in the cylinder and with the chamber outlet in fluid communication with an outlet for the supply of said gas from said cylinder.

13. A gas supply cylinder as claimed in claim 11 containing a pressurised inorganic gas to be supplied from said cylinder, said cylinder comprising a valve, said valve adapted to close said cylinder and having means for filling and removing gas from said cylinder via two internal ports connected to said means for filling and removing of gas from said cylinder, said gas having been introduced into said cylinder from a bulk supply of said gas through said means, said bulk supply of said gas having a nitrogen content of less than 1 ppm$_v$ and a water content of less than 100 ppm$_v$, said cylinder containing the adsorbent connected to one of said ports in contact with said gas for adsorbing water from said gas.

\* \* \* \* \*